United States Patent
Ng et al.

(10) Patent No.: US 8,762,661 B2
(45) Date of Patent: Jun. 24, 2014

(54) SYSTEM AND METHOD OF MANAGING METADATA

(75) Inventors: Wei Loon Ng, Singapore (SG); Feng Shen, Singapore (SG); Stefanus Stefanus, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 888 days.

(21) Appl. No.: 12/233,098

(22) Filed: Sep. 18, 2008

(65) Prior Publication Data

US 2010/0070729 A1  Mar. 18, 2010

(51) Int. Cl.
G06F 12/00 (2006.01)
G06F 13/00 (2006.01)
G06F 13/28 (2006.01)

(52) U.S. Cl.
USPC ..... 711/161; 711/154; 711/162; 711/E12.103

(58) Field of Classification Search
None
See application file for complete search history.

(56) References Cited

U.S. PATENT DOCUMENTS

| | | | | |
|---|---|---|---|---|
| 6,094,729 A * | 7/2000 | Mann | | 714/25 |
| 6,101,616 A * | 8/2000 | Joubert et al. | | 714/11 |
| 6,304,924 B1 * | 10/2001 | Varma | | 710/52 |
| 6,480,949 B2 * | 11/2002 | Wilson et al. | | 711/206 |
| 6,581,132 B1 * | 6/2003 | Kakinuma et al. | | 711/103 |
| 7,275,140 B2 * | 9/2007 | Paley | | 711/159 |
| 7,328,304 B2 | 2/2008 | Royer, Jr. et al. | | 711/113 |
| 7,451,168 B1 * | 11/2008 | Patterson | | 1/1 |
| 7,603,530 B1 * | 10/2009 | Liikanen et al. | | 711/162 |
| 7,617,358 B1 * | 11/2009 | Liikanen et al. | | 711/112 |
| 7,620,769 B2 * | 11/2009 | Lee et al. | | 711/103 |
| 7,620,772 B1 * | 11/2009 | Liikanen et al. | | 711/112 |
| 7,685,360 B1 * | 3/2010 | Brunnett et al. | | 711/112 |
| 7,802,135 B2 * | 9/2010 | Niwa | | 714/15 |
| 2002/0124137 A1 | 9/2002 | Ulrich et al. | | 711/113 |
| 2002/0166026 A1 | 11/2002 | Ulrich et al. | | 711/114 |
| 2003/0005219 A1 | 1/2003 | Royer, Jr. et al. | | 711/113 |
| 2003/0099134 A1 * | 5/2003 | Lasser et al. | | 365/185.29 |
| 2003/0177300 A1 * | 9/2003 | Lee et al. | | 711/103 |
| 2004/0186946 A1 * | 9/2004 | Lee | | 711/103 |
| 2005/0240633 A1 * | 10/2005 | Krishnaswamy et al. | | 707/200 |
| 2007/0016721 A1 * | 1/2007 | Gay | | 711/103 |
| 2007/0094445 A1 | 4/2007 | Trika et al. | | 711/113 |
| 2007/0198796 A1 * | 8/2007 | Warren, Jr. | | 711/165 |
| 2010/0030999 A1 * | 2/2010 | Hinz | | 711/206 |
| 2011/0066788 A1 * | 3/2011 | Eleftheriou et al. | | 711/103 |
| 2011/0138105 A1 * | 6/2011 | Franceschini et al. | | 711/103 |

* cited by examiner

*Primary Examiner* — Edward Dudek, Jr.
*Assistant Examiner* — Matthew Chrzanowski
(74) *Attorney, Agent, or Firm* — Westman, Champlin & Koehler, P.A.

(57) ABSTRACT

In a particular embodiment, a controller is adapted to control read/write access to a storage media including a pre-allocated area having multiple meta-blocks. The controller includes logic adapted to control the multiple meta-blocks as a first in first out (FIFO) circular queue. The logic selects one or more meta-blocks from the multiple meta-blocks based on an order associated with the FIFO circular queue and selectively writes a logical block address (LBA) mapping table to the selected one or more meta-blocks.

18 Claims, 8 Drawing Sheets

SYSTEM AND METHOD OF MANAGING METADATA

FIELD OF THE DISCLOSURE

The present disclosure is generally related to systems and methods of managing metadata. More particularly, the present disclosure is related to systems and methods of power failure resistant metadata management.

BACKGROUND

In general, data storage devices are susceptible to data loss or corruption in the event of a power interruption during operation. When a power loss event occurs during a write operation, the data can be corrupted. Further, when such an event occurs during an update of storage device configuration data, such as wear leveling data or directory mapping data, the stored data may not be recoverable upon subsequent power up and re-initialization.

While it is possible to scan each block, each page, and each sector of a storage media to restore a mapping table upon restart and re-initialization after an unexpected power loss, such reconstruction would be time-consuming and would not satisfy instant-on requirements for solid-state memory. One technique for providing faster reconstruction of the mapping table includes storing such mapping tables (to map a logical block address to a physical address of the storage media) at a reserved (dedicated) meta-block area. However, even if the metadata is stored, multiple copies of the metadata may exist at the reserved meta-block area. In some instances, the storage device controller may select stale or out-of-date metadata and therefore locate an incorrect memory location for a read or write operation.

SUMMARY

In a particular embodiment, a controller is adapted to control read/write access to a storage media including a pre-allocated area having multiple meta-blocks. The controller includes logic adapted to control the multiple meta-blocks as a first in first out (FIFO) circular queue. The logic selects one or more meta-blocks from the multiple meta-blocks based on an order associated with the FIFO circular queue and selectively writes a logical block address (LBA) mapping table to the selected one or more meta-blocks.

In another particular embodiment, a system includes a storage media that is adapted to store data. The storage media includes a pre-allocated area having multiple meta-blocks to store one or more mapping tables. The system further includes a controller adapted to control read/write access to the storage media. The controller includes logic adapted to store a mapping table at one or more selected meta-blocks of the pre-allocated area as a first in first out (FIFO) circular queue. The logic determines whether more than one mapping table is stored at the multiple meta-blocks and selects a mapping table based on a table flag and a location of the selected mapping table within the multiple meta-blocks upon restart and re-initialization after a power loss.

In still another particular embodiment, a method is disclosed that includes writing data to a storage media of a storage device and concurrently writing spare data of a first sector or page with a mapped logical block address, a next free erased block, and a next free block waiting to be erased. The method further includes storing a mapping table and an associated flag at a pre-allocated portion of the storage media at a next meta-block of a plurality of meta-blocks configured to operate as a circular buffer.

DETAILED DESCRIPTION OF ILLUSTRATIVE EMBODIMENTS

In general, a system and method is disclosed for storing a logical block address (LBA) mapping table at a reserved portion of a non-volatile memory, such as a solid-state memory, of a storage device. In a particular example, the reserved portion may be accessible only by a controller. In a particular embodiment, the reserved portion includes a plurality of pre-allocated meta-blocks configured to operate as a first in first out circular buffer to store versions of the LBA mapping table in a sequential order within the meta-blocks. Upon restart and re-initialization of the storage device after an unplanned power loss event, a controller of the storage device includes logic that is adapted to identify a most recent version of the LBA mapping table within the plurality of pre-allocated meta-blocks based on the location of the LBA mapping table within the meta-blocks and based on an associated identifier, which may be a label, a serial number, an incremented number, another identifier, or any combination thereof. By controlling a location and a manner of storing the LBA mapping table, the storage device can reduce or eliminate power-on scanning time and restore the mapping table from the most recent version with limited scanning and reconstruction. Thus, the system can recover a latest and valid meta-data table in case of an unplanned power event and detect possible data corruption due to such a power event by examining spare data in particular data blocks and pages.

Figure 1:
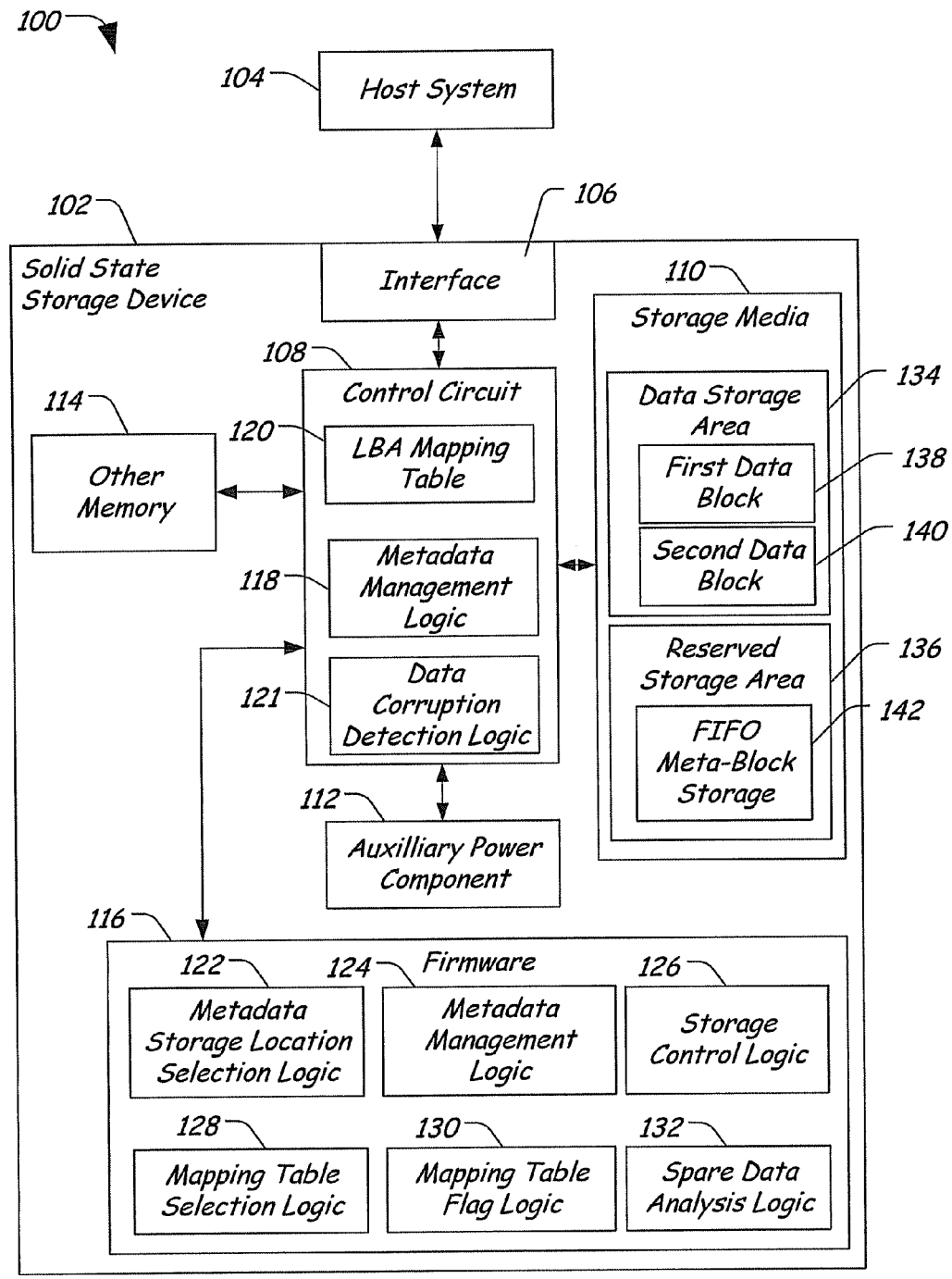
FIG. 1 is a block diagram of a particular illustrative embodiment of a system including a solid-state storage device with logic to manage metadata.

FIG. 1 is a block diagram of a particular illustrative embodiment of a system 100 including a solid-state storage device 102 with logic to manage metadata. In a particular embodiment, the data storage device 102 is a solid-state memory device that is adapted to communicate with a host system 104 via an interface 106. The host system 104 may be a computing system, such a personal computer, a personal digital assistant (PDA), processing logic, another electronic device, or any combination thereof. In a particular example, the host system 104 can be a bus expander, a processor, a personal digital assistant (PDA), another electronic device, or more generally any device capable of generating and/or relaying commands to a mass storage device, such as the data storage device 102.

The data storage device 102 includes a control circuit 108 that is adapted to communicate with a storage media 110. In a particular embodiment, the control circuit 108 includes a processor adapted to execute processor-readable instructions. In a particular example, the storage media 110 is a solid-state storage media that is adapted to store both data blocks and meta-data related to the data blocks. Depending on the implementation, the solid-state memory can be a NAND flash memory, a NOR flash memory, other solid-solid state memory, or any combination thereof. The control circuit 108 also communicates with other memory 114, which can include flash memory, such as NAND flash memory, NOR flash memory, other solid-state memory, or any combination thereof. Further, the control circuit 108 is adapted to communicate with firmware 116, which may be a solid-state memory, such as the code NOR flash memory 234 illustrated in FIG. 2.

In a particular example, when the storage media 110 is a NAND flash solid-state memory, each flash page includes spare bytes. In a particular example, for single-level cell (SLC) NAND flash, there are 16 spare bytes for every 512 bytes of data or 64 spare bytes for each two-kilobyte page of data. Metadata, including logical block address (LBA) data, data to identify a next free erased block, and data to identify a next free block waiting to be erased, are stored in those spare bytes.

The firmware 116 is adapted to store a plurality of instructions that are executable by the control circuit 108, including operating instructions for the storage device 102. The firmware 116 includes metadata storage location selection logic 122 that is executable by the control circuit 108 to select a location at the storage media 110 for reading and writing data (including spare data) and for reading and writing a mapping table, such as a logical block address (LBA) mapping table. The firmware 116 also includes metadata management logic 124 that is executable by the control circuit 108 to selectively execute one or more modules stored the firmware 116, including storage control logic 126, mapping table selection logic 128, and other modules. The firmware 116 further includes storage control logic 126 that is executable by the control circuit 108 to control access to at least a portion of the storage media 110. In a particular example, the storage media 110 includes a data storage area 134 and a reserved storage area 136. The data storage area 134 can include a first data block 138, a second data block 140, other data blocks, or any combination thereof. The reserved storage area 136 includes a plurality of meta-blocks that are adapted to store a logical block address (LBA) mapping table in a first in first out (FIFO) meta-block storage 142. In a particular example, the FIFO meta-block storage 142 is pre-allocated with multiple meta-blocks and access to the multiple meta-blocks is controlled by the storage control logic 126, such that a mapping table is selectively written to selected meta-blocks of the multiple meta-blocks within the pre-allocated storage area (the reserved storage area 136) in a FIFO order. In a particular example, the storage control logic 126 is executable by the control circuit 108 to control the writing of the LBA mapping table to the multiple meta-blocks so that the multiple meta-blocks functions as a circular buffer.

The firmware 116 further includes mapping table selection logic 128 that is executable by the control circuit 108 to identify a most recent mapping table stored at one or more of the multiple meta-blocks within the FIFO meta-block storage 142. In a particular example, the mapping table selection logic 128 is adapted to determine which mapping table is more up-to-date from multiple mapping tables stored in the FIFO meta-block storage 142 based on an associated flag (or indicator) and based on a location of the selected mapping table within the one or more meta-blocks. In a particular example, the storage control logic 126 controls access to the reserved storage area 136 and controls storage of the mapping table at a selected point within the circular buffer provided by the FIFO meta-block storage 142. In this example, the location of a mapping table within the FIFO meta-block storage 142 reflects the relative currency of LBA mapping table. Further, the associated flag may represent a serial number or other unique identifier that provides a further indication of a most recent LBA mapping table within the FIFO meta-block storage 142. In a particular example, the firmware 116 also includes mapping table flag logic 130 adapted to assign a unique identifier to the mapping table being stored at the FIFO meta-block storage 142. The firmware 116 further includes spare data analysis logic 132 that is executable by the control circuit 108 to determine whether the spare data of a next free erased block and/or a next block waiting to be erased reflect that the next free erased block has already been written or the next block waiting to be erased has already been erased. In either case, the particular mapping table may be out of date and can be updated by the control circuit 108 based on the spare data.

The control circuit 108 is also coupled to an auxiliary power component 112. In a particular embodiment, the auxiliary power component 112 can be a capacitor or a battery that is adapted to supply power to the storage device 102 under certain operating conditions. In a particular example, the auxiliary power component 112 can provide a power supply to the control circuit 108 and to at least one of the storage media 110, the other memory 114, and the firmware 116 to record data when power is unexpectedly turned off.

In a particular embodiment, the storage device 102 includes the storage media 110 is adapted to store data at a data storage area 134 and includes a pre-allocated area, such as the reserved storage area 136, which includes the FIFO meta-block storage 142 or multiple meta-data blocks. The storage device 102 also includes a controller (such as the control circuit 108) that is adapted to control read/write access to the storage media 110. The control circuit 108 includes logic, such as metadata management logic 118 to control updates to metadata such as an LBA mapping table 120 and to control storage of the LBA mapping table 120 at a portion of the storage media 110. Further, the control circuit 108 includes data corruption detection logic 121, which is adapted to detect data corruption in data stored at the storage media 110 based on spare data stored in a first page or sector of a data block. In a particular embodiment, the data corruption detection logic 121 includes the spare data analysis logic 132 loaded from the firmware 116. Further, the control circuit 108 is adapted to load such logic from the firmware 116.

The firmware 116 includes the storage control logic 126, which is adapted to control FIFO meta-block storage 142 to function as a first in first out (FIFO) circular queue. The storage control logic 126 is executable by the control circuit 108 to select one or more meta-blocks from the multiple meta-blocks of the FIFO meta-block storage 142 based on an order associated with the FIFO circular queue and to selectively write a logical block address (LBA) mapping table to the selected one or more meta-blocks at the FIFO meta-block storage 142.

In a particular example, the control circuit 108 includes metadata management logic 118, such as the mapping table flag logic 130 to store a table flag with the LBA mapping table at the selected one or more meta-blocks of the FIFO meta-block storage 142. In a particular embodiment, upon restart or re-initialization, the control circuit 108 is adapted to load the LBA mapping table 120 from the FIFO meta-block storage 142. The control circuit 108 is adapted to execute the metadata management logic 124, including the mapping table selection logic 128 and the storage control logic 126 to access the reserved storage area 136 and to determine whether more than one LBA mapping table is stored at the FIFO meta-block storage 142. The mapping table selection logic 128 can be used to select a LBA mapping table based on a table flag and a location of the selected LBA mapping table within the FIFO meta-block storage 142.

In another particular embodiment, the control circuit 108 includes the data corruption detection logic 121 to verify a next free erased block and a next block waiting to be erased identified by the selected LBA mapping table. In a particular example, the data corruption detection logic 121 is loaded from the spare data analysis logic 132 of the firmware 116. In a particular example, the data corruption detection logic 121 is adapted to read spare data from the next free erased block and from the next block waiting to be erased to determine whether the selected LBA mapping table 120 is correct. For example, if the LBA mapping table 120 identifies a next free erased block, but the identified next free erased block has already been written, then the LBA mapping table 120 is out of date, and the data corruption detection logic 121 is adapted to provide updated data to the metadata management logic 118 for updating the LBA mapping table 120. Further, if the LBA mapping table 120 identifies a next block waiting to be erased and the data corruption detection logic 121 determines that it has already been erased, the data corruption detection logic 121 provides the updated data to the metadata management logic 118 to update the LBA mapping table 120.

In a particular example, the metadata management logic 118 is executable by the control circuit 108 to update the LBA mapping table 120 after writing data to the storage media 110, after a garbage collection operation (such as after erasing duplicate, stale, or otherwise undesired data from the storage media 110), and after a pinned set of data is removed from a data cache. In general, the term "pinned set" refers to a concept in the Advanced Technology Attachment (ATA)—8 Hybrid Drive specification, which was proposed by Microsoft® Corporation and used by a software component of the Vista® operating system called ReadyDrive®. In general, the host operating system Vista® is aware of the existence of a non-volatile cache (NVC) in the storage device 102. The host operating system utilizes the NVC by "pinning" logical block addresses (LBAs) into the NVC. Generally, the host tries to "pin" into the NVC those LBAs that it predicts it will need to access soon. Since the cache access is faster than the storage media access, performance of data access to and from the storage device 102 is improved by eliminating overhead associated with disc seeks and disc revolutions for small read/write operations. According to the ATA-8 specification, the pinned LBAs stay in NVC whether garbage collection occurs or not, unless host operating system explicitly removes them. In a particular instance, the host operating system may pin and then unpin some LBAs. The unpinned set may remain in the NVC instead of being invalidated or erased totally from the NVC. If an unplanned power loss event occurs before this new information is saved to a particular meta-block, data loss may occur. In this instance, the unpinned set will still be restored as the pinned set after recovering from the power loss event. However, in this instance, such restoration does not impact the operating system or the data integrity of the storage device, since the operating system can query the storage device to get the latest information and since the data integrity is intact, even if the restored cache memory is out-of date.

In general, the free erased blocks are sorted by their erase count and physical block identifiers (IDs). If data is written to one of the free erased blocks before an unplanned power loss, the control circuit 108 is adapted to use the metadata management logic 118 and the data corruption detection logic 121 to locate uniquely a next free erased block and to check whether the next free erased block is already written. If the next free erased block is not written, there was either no unplanned power loss or there is no data corruption. If the next free erased block is written, data corruption is detected and the metadata management logic 118 can initiate a data restoration process.

In a particular example, to detect whether the next free erased block is written, a 32-bit input/output error correction code (IOECC) may be used. After erasing the data block, a sector (512 bytes) should be reset to be "0xFF" and sixteen (16) spare bytes that contain the IOECC should also be reset to "0xFF." However, if the sector has been programmed, the IOECC bytes should reflect the writing. In a particular example, the IOECC bytes have a value of 0xECOB 3E1E, which indicates that the sector has been written.

In general, by pre-allocating meta-blocks within a reserved storage area 136 for use a first in first out (FIFO) circular buffer, power-on scanning time associated with reconstructing a logical block address (LBA) mapping table after an unplanned power loss can be reduced. Additionally, by using the FIFO circular buffer to store the LBA mapping table, a most recent version of the LBA mapping table can be readily identified based on its associated flag and its location within the circular buffer.

Figure 2:
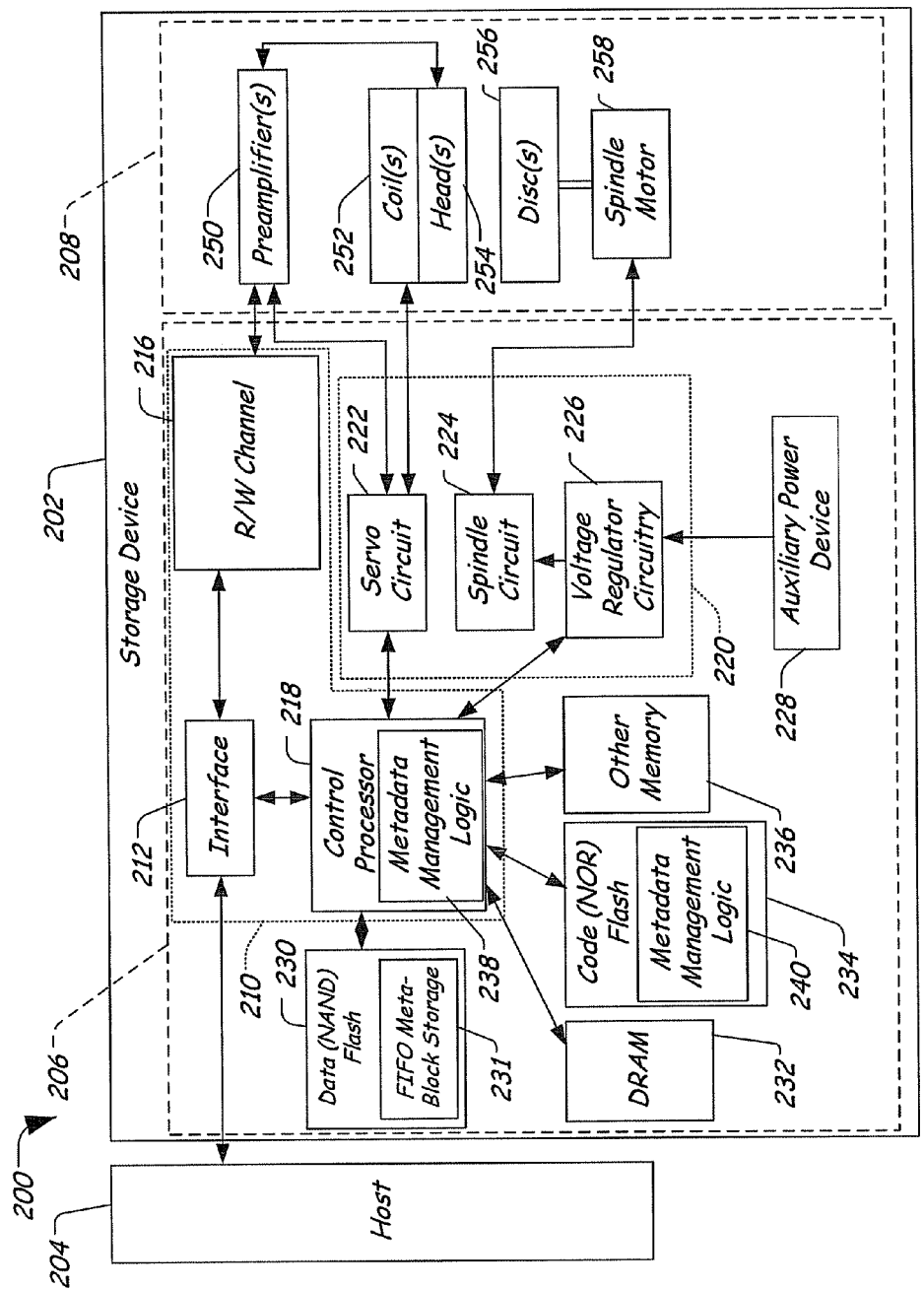
FIG. 2 is a block diagram of a second particular illustrative embodiment of a system including a rotatable storage media and a solid-state storage media and including logic to manage metadata.

FIG. 2 is a block diagram of a second particular illustrative embodiment of a system 200 including a hybrid storage device 202 with metadata management logic. As used herein, the term "hybrid storage device" refers to a data storage device that includes both rotating storage media and solid-state storage media. The hybrid storage device 202 is adapted to communicate with a host system 204. In a particular embodiment, the host system 204 can be a computer, a processor, a personal digital assistant (PDA), another electronic device, or any combination thereof. In a particular embodiment, the hybrid storage device 202 can be a stand-alone storage device that communicates with the host system 204 via a universal serial bus (USB) or other interface. In another particular embodiment, the stand-alone hybrid storage device 202 can communicate with the host system 204 via a network.

The hybrid storage device 202 includes recording subsystem circuitry 206 and a head-disc assembly 208. The recording subsystem 206 includes storage device read/write control circuitry 210 and disc-head assembly control circuitry 220. The recording subsystem circuitry 206 includes an interface circuit 212, which includes a data buffer for temporarily buffering the data and a sequencer for directing the operation of the read/write channel 216 and the preamplifier 250 during data transfer operations. The interface circuit 212 is coupled to the host system 204 and to a control processor 218, which is adapted to control operation of the hybrid storage device 202. In a particular embodiment, the control processor 218 includes metadata management logic 238 that is adapted to control storage of a mapping table, such as a logical block address (LBA) mapping table within a portion of a non-volatile memory, such as a data (NAND) flash 230. In general, the non-volatile memory can be a rotatable memory, a solid-state memory, or any combination thereof. In a particular embodiment, the metadata management logic 238 is adapted to selectively store the LBA mapping table at the data (NAND) flash 230 in a pre-allocated portion and in a controlled manner. In a particular example, the pre-allocated portion includes a plurality of meta-blocks, and the metadata management logic 238 is adapted to use the pre-allocated portion of the data (NAND) flash 230 as a circular buffer (such as a first in first out (FIFO) meta-block storage 231. The metadata management logic 238 stores the LBA mapping table at one or more selected meta-blocks of the FIFO meta-block storage 231 at the data (NAND) flash 230. Additionally, the metadata management logic 238 is adapted to identify data corruption and to select and update a LBA mapping table as needed.

In a particular embodiment, the metadata management logic 238 is executable by the control processor 218 to select a most recent version of the LBA mapping table from the FIFO meta-block storage 231 based on a mapping table flag associated with the selected mapping table and based on a location of the selected mapping table within the FIFO meta-block storage 231. Additionally, the metadata management logic 238 is adapted to read spare data associated with one of a next free erased block and a next block waiting to be erased to detect possible data corruption. For example, if the mapping table that is selected indicates a block to be a next free erased block, but the block has already been written, then the mapping table is out of date and should be updated. Further, if the mapping table that is selected indicates a block to be a next block waiting to be erased, but the block has already been erased, then the mapping table is out of date. In a particular embodiment, the metadata management logic 238 can include processor executable instructions that are stored at a code (NOR) flash 234 as metadata management logic instructions 240. The metadata management logic 238 can be loaded and executed by the control processor 218.

The control processor 218 is coupled to a servo circuit 222 that is adapted to control the position of one or more read/write heads 254 relative to the one or more discs 256 as part of a servo loop established by the one or more read/write heads 254. Generally, the one or more read/write heads 254 are mounted to a rotary actuator assembly to which a coil 252 of a voice coil motor (VCM) is attached. As is known in the art, a VCM includes a pair of magnetic flux paths between which the coil 252 is disposed so that the passage of current through the coil causes magnetic interaction between the coil 252 and the magnetic flux paths, resulting in the controlled rotation of the actuator assembly and the movement of the one or more heads 254 relative to the surfaces of the one or more discs 256. The servo circuit 222 is used to control the application of current to the coil 252, and hence the position of the heads 254 with respect to the tracks of the one or more discs 256.

In general, the disc-head assembly control circuitry 220 includes the servo circuit 222 and includes a spindle circuit 224 that is coupled to a spindle motor 258 to control the rotation of the one or more discs 256. The hybrid storage device 202 also includes an auxiliary power device 228 that is coupled to voltage regulator circuitry 226 of the disc-head assembly control circuitry 220 and that is adapted to operate as a power source when power to the hybrid storage device 202 is lost. In a particular embodiment, the auxiliary power device 228 can be a capacitor or a battery that is adapted to supply power to the hybrid storage device 202 under certain operating conditions. In a particular example, the auxiliary power device 228 can provide a power supply to the recording subsystem assembly 206 and to the disc-head assembly 208 to record data to the one or more discs 256 when power is turned off. Further, the auxiliary power device 228 may supply power to the recording subsystem assembly 206 to record data to the data (NAND) flash 230 or to the code (NOR) flash 234 when power is turned off.

Additionally, the hybrid storage device 202 includes the data (NAND) flash 230, a dynamic random access memory (DRAM) 232, the code (NOR) flash 234, other memory 236, or any combination thereof. In a particular embodiment, the code (NOR) flash 234 is accessible to the control processor 218 and is adapted to store the metadata management logic instructions 240. In a particular embodiment, the data (NAND) flash 230 may store a logical block address (LBA) lookup table at the FIFO meta-block storage 231 that represents a mapping of logical block addresses to physical memory locations within the one or more discs 256.

In a particular embodiment, the control processor 218 is adapted to load and execute the metadata management logic instructions 240 from the code (NOR) flash 234 and to maintain the metadata management logic 238 within a memory of the control processor 218. During operation, the metadata management logic 238 controls storage of a logical block address (LBA) mapping table in a FIFO meta-block storage 231 at the data (NAND) flash 230. When power is lost, the storage device 202 shuts down. Upon restart and re-initialization, the metadata management logic 238 is reloaded and executed by the control processor 218. The metadata management logic 238 accesses the FIFO meta-block storage 231, identifies a most recent version of the LBA mapping table based on its location and a flag stored at the FIFO meta-block storage 2321, and loads the LBA mapping table into a memory of the control processor 218. Further, the metadata management logic 238 is adapted to identify a next free erased block from the LBA mapping table and to access spare data of the identified next free erased block to determine whether the block has been erased. If so, there is no corruption. If not, then there may be data corruption, and at least the LBA mapping table needs to be updated, if not reconstructed. Further, the metadata management logic 238 is adapted to identify a next block waiting to be erased in the LBA mapping table and to access the next block to be erased to determine whether the block has been erased. If not, there is no apparent corruption. However, if so, then there may be data corruption and at least the LBA mapping table should be updated. In a particular embodiment, upon detection of data corruption, the metadata management logic 238 may initiate reconstruction of the LBA mapping table by scanning the metadata of data blocks stored at the storage media, such as the one or more discs 256.

In general, while the above-discussion has described storing the logical block address (LBA) mapping table at a set of meta-blocks associated with a reserved area of a solid-state memory, it should be understood that the reserved area can be formed at the one or more discs 256. In a particular example, a portion of the one or more discs 256 may be configured to operate as a first in first out (FIFO) circular buffer for storing the LBA mapping table.

Figure 3:
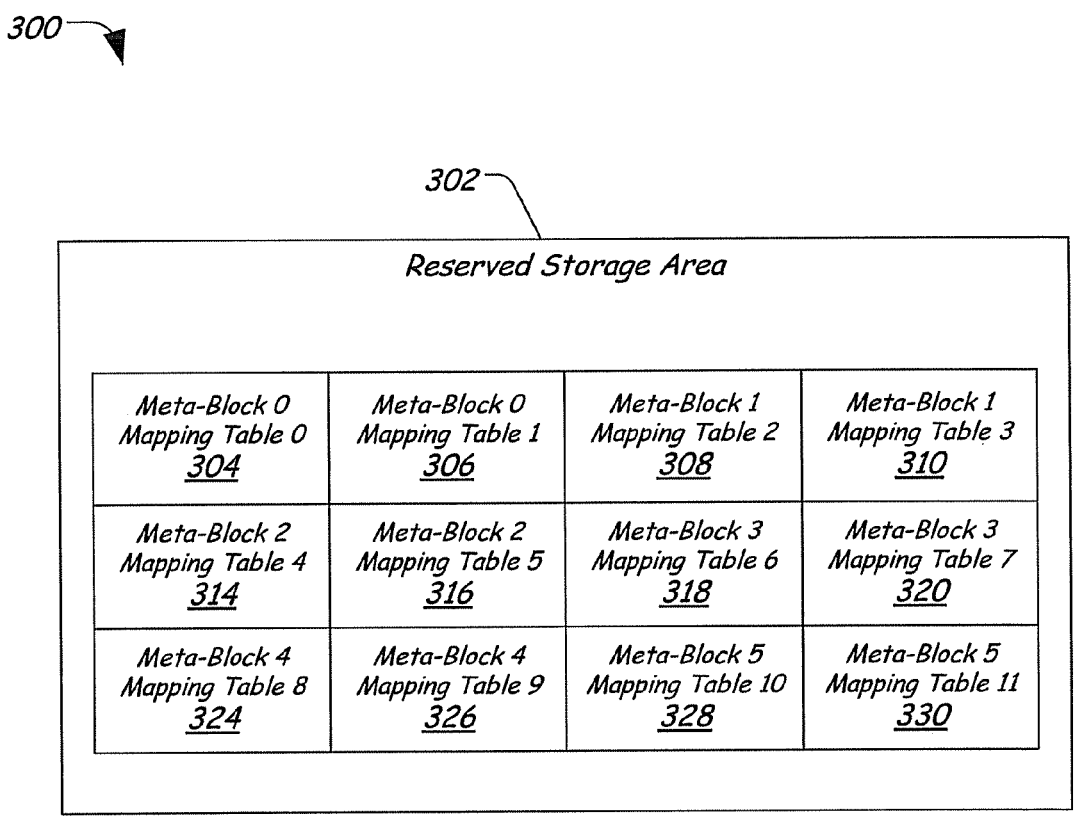
FIG. 3 is a block diagram of a portion of a storage media including meta-blocks reserved for storage of mapping table data in a particular order, where the portion is configured to operate as a first in first out circular buffer.

FIG. 3 is a block diagram 300 of a reserved storage area 302 of a storage media including meta-blocks reserved for storage of mapping table data according to a method managing metadata. The reserved storage area 302 includes a plurality of meta-blocks 304, 306, 308, 310, 314, 316, 318, 320, 324, 326, 328, and 330 that are pre-allocated for storage of mapping table data and associated flags in a first in first out (FIFO) circular buffer configuration.

In a particular example, the meta-blocks 304 and 306 represent a first position within the FIFO circular buffer of pre-allocated meta-blocks and currently store mapping tables 1 and 2. In a particular embodiment, the mapping table 2 may be a newer version of mapping table 1. The meta-blocks 308 and 310 represent a second position within the FIFO circular buffer and currently store mapping tables 3 and 4. The mapping table 3 may be a more current version of mapping table 2, and mapping table 4 may be a more current version of mapping table 3. The meta-blocks 314 and 316 represent a third position within the FIFO circular buffer and currently store mapping tables 5 and 6, which may be a more recent versions of mapping tables 4 and 5, respectively. The meta-blocks 318 and 320 represent a fourth position within the FIFO circular buffer and currently store mapping tables 6 and 7, which may represent a more recent versions of mapping tables 5 and 6, respectively. The meta-blocks 324 and 326 represent a fifth position within the FIFO circular buffer and currently store mapping tables 8 and 9, which may represent more recent versions of the mapping tables 7 and 8, respectively. The meta-blocks 328 and 330 represent a sixth position within the FIFO circular buffer and currently store mapping tables 10 and 11, which may represent more recent versions of the mapping tables 9 and 10, respectively.

In a particular illustrative embodiment, a next version of the mapping table may be stored at the meta-block 304, overwriting the mapping table version stored at the meta-block 304. Subsequent versions of the mapping table may be written sequentially at the meta-blocks 306, 308, 310, and so on.

Upon restart and re-initialization after an unexpected power loss event, metadata management logic, such as the metadata management logic 238 illustrated in FIG. 2, is adapted to traverse the reserved storage area 302 and to scan the meta-blocks 304, 306, 308, 310, 314, 316, 318, 320, 324, 326, 328, and 330 sequentially, until a most recent version of the mapping table is determined, based on its location within the circular buffer and based on its identifier (or flag). For example, in this instance, the most recent version of the mapping table is stored at the meta-block 330 and has a sequential identifier (flag) of "11." A subsequent version of the mapping table will be written to the meta-block 304 and will be assigned a sequential identifier (flag) of "12." In this way, the FIFO meta-blocks can be controlled and operated as a circular buffer to make it easier to determine which of the mapping tables is most recent.

In general, the example provided in FIG. 3 is intended for illustrative purposes only. Other flags (identifiers) and a different non-sequential pattern may be used to store the mapping table at the pre-allocated meta-blocks, depending on the particular implementation.

Figure 4:
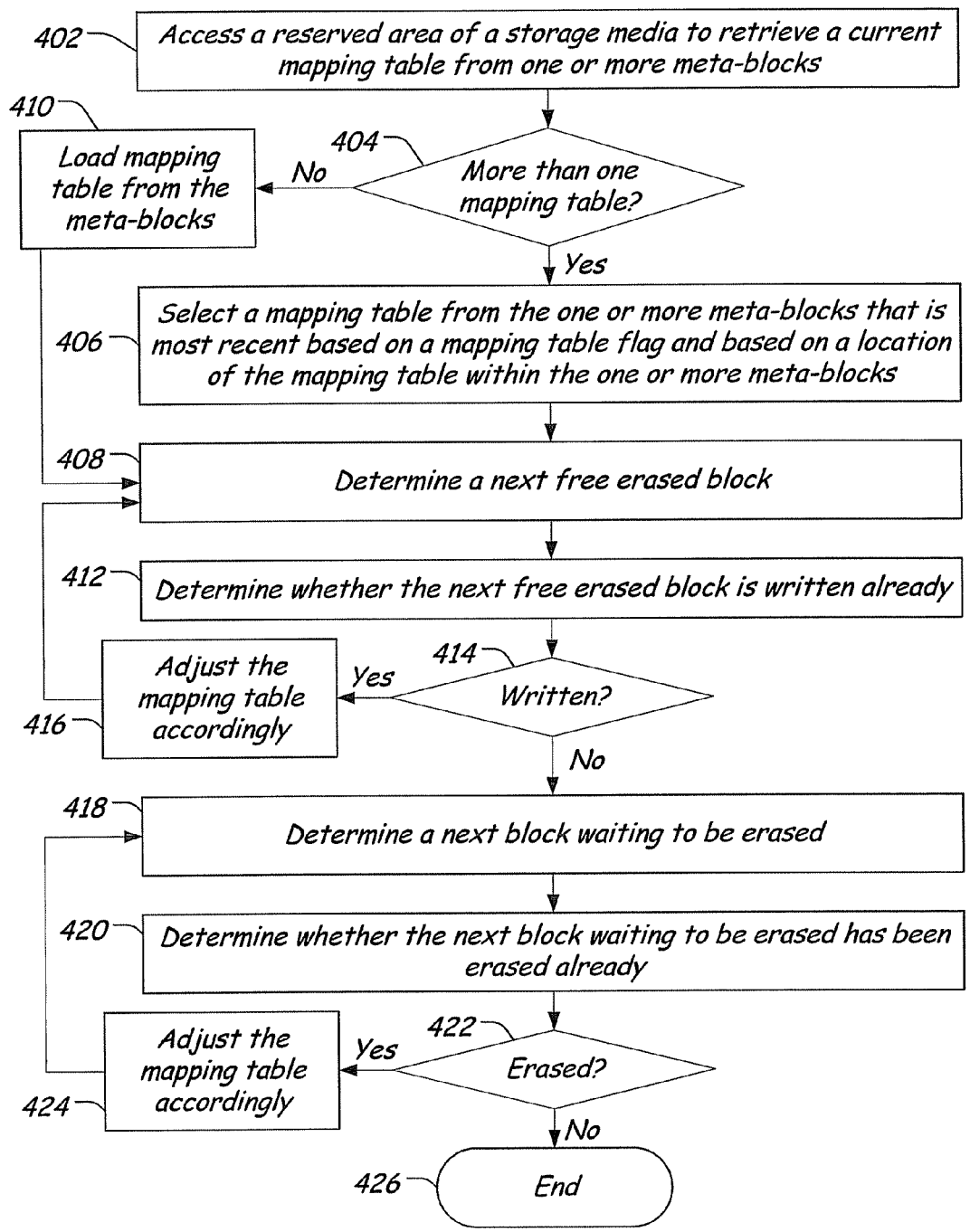
FIG. 4 is a flow diagram of a particular illustrative embodiment of a method of managing metadata.

FIG. 4 is a flow diagram of a particular illustrative embodiment of a method of managing metadata. At 402, a reserved area of the storage media is accessed to retrieve a current mapping table from one or more meta-blocks. Moving to 404, if there is only one mapping table stored at the one or more meta-blocks, the method advances to 410 and the mapping table is loaded from the meta-blocks. The method advances to 408, and a next free erased block is determined. In a particular example, the next free erased block can be determined from the selected mapping table, by scanning the spare data of the storage media, or any combination thereof. Continuing to 412, the system determines whether the next free erased block has already been written. If it has been written at 414, the system returns to 408 and determines a next free erased block.

Returning to 404, if more than one mapping table is stored at the meta-blocks, the method advances to 406 and a mapping table is selected from the on or more meta-blocks that is most recent based on a mapping table flag and based on a location of the mapping table within the one or more meta-blocks. Continuing to 408, a next free erased block is determined. In a particular example, the next free erased block can be determined from the selected mapping table, by scanning the spare data of the storage media, or any combination thereof. Continuing to 412, the system determines whether the next free erased block has already been written. If it has been written at 414, the system advances to 416 and adjusts the mapping table accordingly. The method advances to 408 and determines a next free erased block.

Returning to 414, if the next free erased block has not been written, the method continues to 418 and a next block waiting to be erased is determined. Proceeding to 420, the system determines whether the next block waiting to be erased has been erased already. At 422, if the next block waiting to be erased has already been erased, the method advances to 424 and the mapping table is adjusted accordingly. Continuing to 418, a next block waiting to be erased is determined. Returning to 422, if the next block waiting to be erased has not been erased yet, the method terminates without error at 426.

Figure 5:
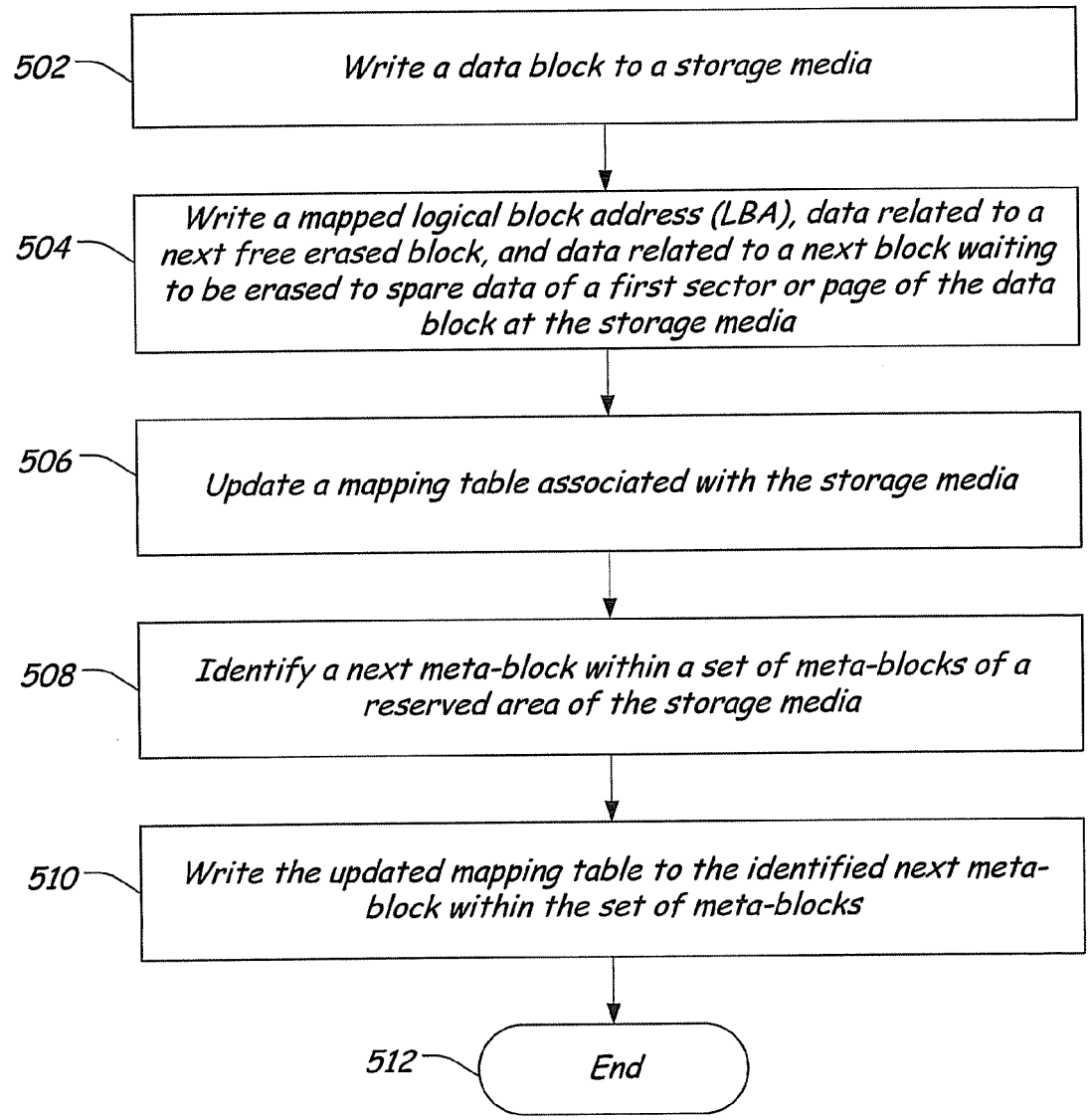
FIG. 5 is a flow diagram of a second particular illustrative embodiment of a method of managing metadata.

FIG. 5 is a flow diagram of a second particular illustrative embodiment of a method of managing metadata. At 502, a data block is written to a storage media. Continuing to 504, a mapped logical block address (LBA), data related to a next free erased block, and data related to a next block waiting to be erased are written to spare data of a first sector or page of the data block at the storage media. Moving to 506, a mapping table associated with the storage media is updated. Advancing to 508, a next meta-block within a set of meta-blocks of a reserved area of the storage media is identified. In a particular embodiment, the set of meta-blocks is configured to operate as a first in first out (FIFO) circular queue, and the identified next meta-block is a next location within the FIFO circular queue. Proceeding to 510, the updated mapping table is written to the identified next meta-block within the set of meta-blocks. In a particular example, the updated mapping table and an associated identifier or flag is written to the next meta-block. The method terminates at 512.

Figure 6:
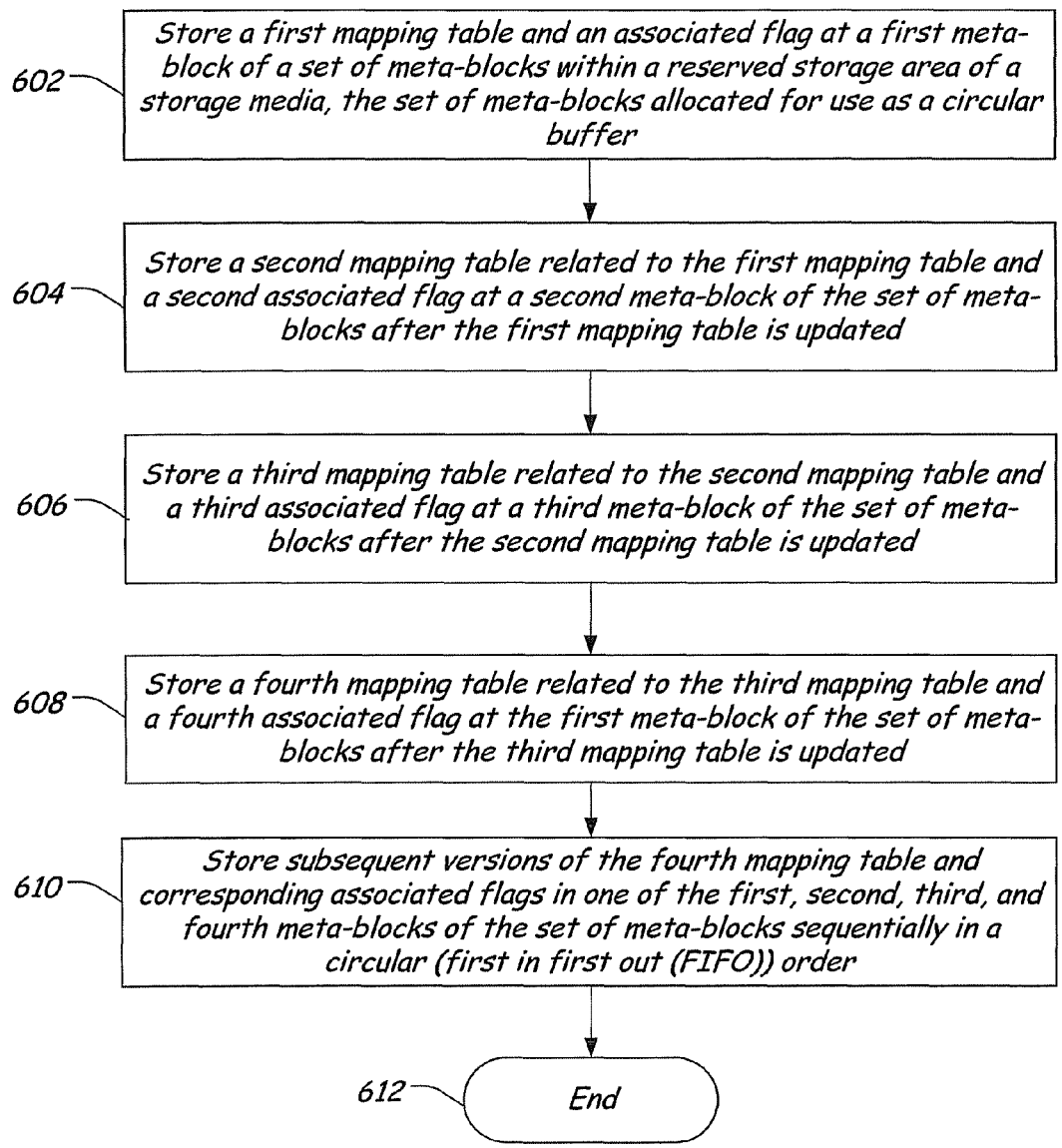
FIG. 6 is a flow diagram of a third particular illustrative embodiment of a method of managing metadata.

FIG. 6 is a flow diagram of a third particular illustrative embodiment of a method of managing metadata. At 602, a first mapping table and an associated flag are stored at a first meta-block of a set of meta-blocks within a reserved storage area of a storage media, where the set of meta-blocks is allocated for use as a circular buffer. Advancing to 604, a second mapping table and a second associated flag are stored at a second meta-block of the set of meta-blocks after the first mapping table is updated. Continuing to 606, a third mapping table and a third associated flag are stored at a third meta-block of the set of meta-blocks after the second mapping table is updated. Proceeding to 608, a fourth mapping table and a fourth associated flag are stored at a fourth meta-block of the set of meta-blocks after the first mapping table is updated. Moving to 610, subsequent versions of the fourth mapping table and corresponding associated flags are stored in one of the first, second, third, and fourth meta-blocks of the set of meta-blocks sequentially in a circular (first in first out (FIFO)) order. The method terminates at 612.

In a particular embodiment, upon recovery from an unexpected power loss event, a controller can determine a most recent version of the mapping table based on its location within the meta-blocks and based on its associated flag. In a particular example, the associated flags are incremented so that the most recent version of the mapping table has an associated flag with a highest value. In a particular illustrative example, the associated flag can be a serial number.

Figure 7:
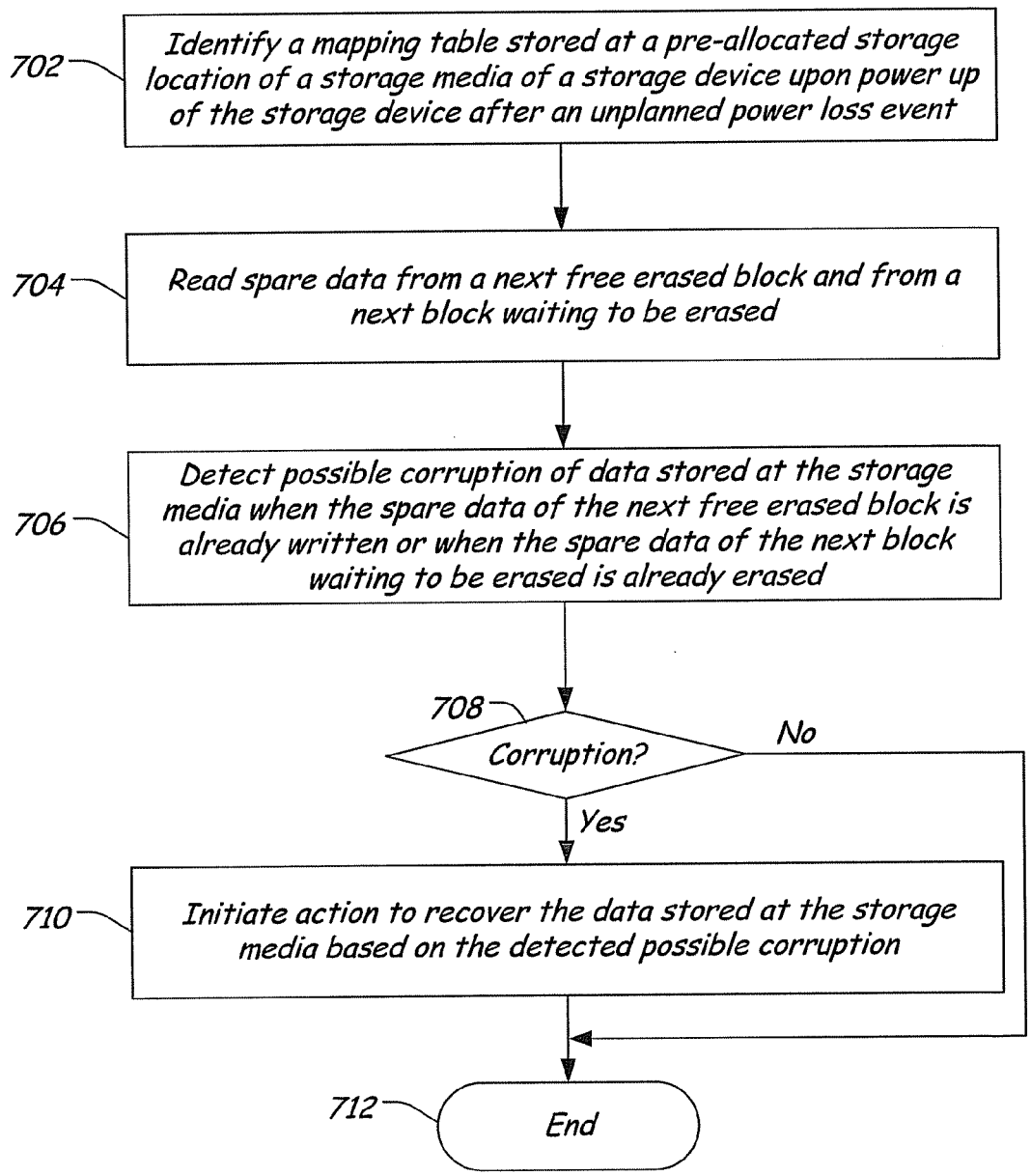
FIG. 7 is a flow diagram of a fourth particular illustrative embodiment of a method of managing metadata.

FIG. 7 is a flow diagram of a fourth particular illustrative embodiment of a method of managing metadata. At 702, a mapping table that is stored at a pre-allocated storage location of a storage media of a storage device is identified upon power up of the storage device after an unplanned power loss event. In a particular embodiment, the mapping table is identified based on its location within meta-blocks at the pre-allocated storage location, which meta-blocks are configured to operate as a circular buffer. In another particular embodiment, the mapping table is identified based on its location within the circular buffer and based on an identifier (such as a flag, a serial number, or any combination thereof) that is associated with the mapping table. Moving to 704, spare data is read from a next free erased block and from a next block waiting to be erased. In a particular example, the next free erased block and the next block waiting to be erased are identified within the mapping table. In another particular embodiment, the next free erased block and the next block waiting to be erased are identified by scanning metadata associated with the storage media.

Continuing to 706, possible corruption of data at the storage media or of the mapping table is detected when the spare data of the next free erased block is already written or when the spare data of the next block waiting to be erased is already erased. At 708, if no corruption is detected, the method terminates without error at 712. Otherwise, if corruption is detected at 708, the method advances to 710 and actions are initiated to recover the data stored at the storage media based on detection of the possible corruption. The method terminates at 712.

Figure 8:
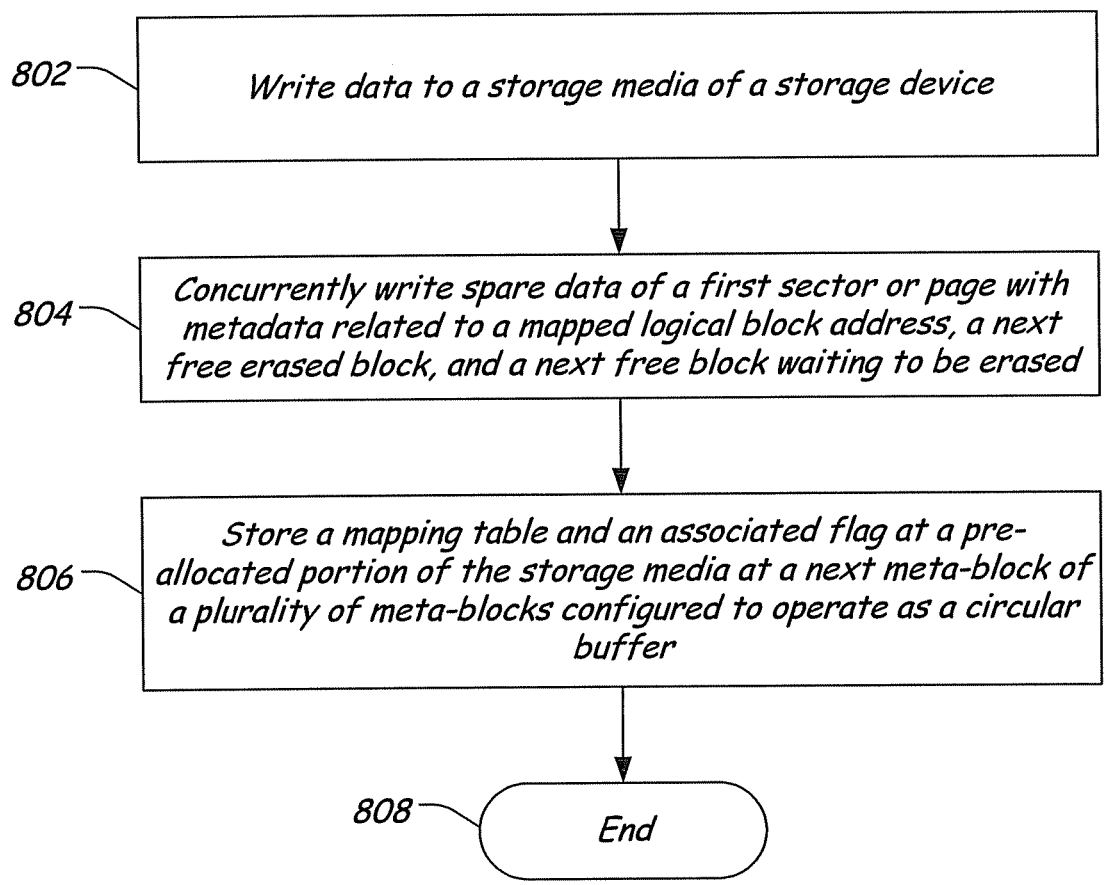
FIG. 8 is a block diagram of a fifth particular illustrative embodiment of a method of managing metadata.

FIG. 8 is a block diagram of a fifth particular illustrative embodiment of a method of managing metadata. At 802, data is written to a storage media of a storage device. Advancing to 804, spare data of a first sector or page is concurrently written with a mapped logical block address, a next free erased block, and a next free block waiting to be erased. Continuing to 806, a mapping table and an associated flag are stored at a pre-allocated portion of the storage media at a next meta-block of a plurality of meta-blocks configured to operate as a circular buffer. In a particular embodiment, the mapping table is written to the pre-allocated area in a first in first out (FIFO) order. The method terminates at 808.

In a particular embodiment, the storage device is restarted and re-initialized after an unplanned power loss event. In this example, a most recent mapping table is selected from the pre-allocated portion of the storage media based on a flag associated with the mapping table and based on a location of the mapping table within the plurality of meta-blocks. In a particular embodiment, a next free erased block at the storage media is located, spare data is read from the next free erased block to determine whether the next free erased block is written, the selected mapping table is updated when the next free erased block is written.

In another particular embodiment, a next block waiting to be erased is located at the storage media, spare data is read from the next block to be erased to determine whether the next block to be erased is already erased, and the selected mapping table is updated when the next block to be erased is already erased.

In yet another particular embodiment, a mapping table is selected from the pre-allocated area of the solid-state storage media based on an associated flag and a location of the selected mapping table within the pre-allocated area. The selected mapping table is loaded and one of a next free erased block and a next block waiting to be erased is identified. Spare data associated with the identified one of the next free erased block and the next block waiting to be erased is read and the selected mapping table is updated when the spare data indicates that the selected mapping table is out of date.

In another particular embodiment, a mapping table from the pre-allocated area of the solid-state storage media is selected based on an associated flag and a location of the selected mapping table within the pre-allocated area. The selected mapping table is loaded and one of a next free erased block and a next block waiting to be erased is identified. Spare data associated with the identified one of the next free erased block and the next block waiting to be erased to detect data corruption is read and the selected mapping table is updated in response to detection of data corruption. In a particular example, the selected mapping table may be reconstructed by scanning the storage media when data corruption is detected.

In conjunction with the systems, storage devices, and method described above with respect to FIGS. 1-8, a technique is disclosed for utilizing pre-allocated meta-blocks of a solid-state storage device, such as a flash memory, to store a mapping table in a first in first out (FIFO) circular buffer fashion. The mapping table may be stored at a location within the meta-blocks together with a serial number, flag, identifier, or any combination thereof. Upon restart and re-initialization of the storage device after an unplanned power loss event, the controller can readily identify a most recent stored version of the mapping table from the meta-blocks by examining a location of the mapping table within the meta-blocks and an associated identifier. Further, the most recent version of the mapping table can be updated with next free erased block and next block waiting to be erased location information, when the mapping table data is found to be out of date (i.e., when the next block is already written or erased). Further, corrective action can be taken to reconstruct the mapping table if such discrepancies are found.

Although the present invention has been described with reference to preferred embodiments, workers skilled in the art will recognize that changes may be made in form and detail without departing from the spirit and scope of the invention.

What is claimed is:

1. A method comprising:
   storing time-separated versions of a mapping table in a plurality of pre-allocated meta-blocks on a data storage medium as a first in first out (FIFO) circular queue; and
   determining whether more than one of the versions of the mapping table are stored in the plurality of pre-allocated meta-blocks,
   wherein the data storage medium is a part of a data storage device,
   wherein each one of the versions of the mapping table maps logical block addresses to addresses of physical blocks in the data storage device, and
   wherein each one of the versions is stored at a different location in the FIFO circular queue than other versions of the mapping table, and
   wherein the location at which a particular version of the mapping table is stored in the FIFO circular queue reflects a relative currency of the particular version of the mapping table with respect to other versions of the mapping table stored in the FIFO circular queue.

2. The method of claim 1 and further comprising:
   restarting the data storage device; and
   when a determination is made that more than one of the versions of the mapping table are stored in the plurality of pre-allocated meta-blocks, selecting a most recent version of the versions of the mapping table from the plurality of pre-allocated meta-blocks.

3. The method of claim 2 and wherein the selecting the most recent version of the versions of the mapping table from the plurality of pre-allocated meta-blocks is based on a flag associated with the most recent version of the versions of the mapping table and based on a location of the most recent version the versions of the mapping table within the plurality of meta-blocks.

4. The method of claim 2 and further comprising:
locating, based on the selected version of the versions of the mapping table, a next free erased block of the physical blocks in the data storage device;
reading spare data from the next free erased block to determine whether the next free erased block is written; and
updating the selected version of the versions of the mapping table when the next free erased block is written.

5. The method of claim 2 and further comprising:
locating, based on the selected version of the versions of the mapping table, a next block, of the physical blocks in the data storage device, to be erased;
reading spare data from the next block to be erased to determine whether the next block to be erased is already erased; and
updating the selected version of the versions of the mapping table when the next block to be erased is already erased.

6. The method of claim 1 and further comprising:
selecting a most recent version of the versions of the mapping table from the plurality of pre-allocated meta-blocks based on an associated flag and a location of the most recent version of the versions of the mapping table;
loading the selected version of the versions of the mapping table;
identifying, from the selected version of the versions of the mapping table, one of a next free erased block of the physical blocks or a next block, of the physical blocks, waiting to be erased;
reading spare data associated with the identified one of the next free erased block or the next block waiting to be erased; and
updating the selected version of the versions of the mapping table when the spare data indicates that the selected version of the versions of the mapping table is out of date.

7. The method of claim 1 and further comprising:
selecting a most recent version of the versions of the mapping table from the plurality of pre-allocated meta-blocks based on an associated flag and a location of the most recent version of the versions of the mapping table;
loading the selected version of the versions of the mapping table;
identifying, from the selected version of the versions of the mapping table, one of a next free erased block of the physical blocks or a next block, of the physical blocks, waiting to be erased;
reading spare data associated with the identified one of the next free erased block or the next block waiting to be erased; and
updating the selected version of the versions of the mapping table in response to detection of data corruption.

8. A system comprising:
a pre-allocated storage area including multiple meta-blocks; and
a controller configured to store one or more time-separated versions of a mapping table at one or more selected meta-blocks of the multiple meta-blocks as a first in first out (FIFO) circular queue, the controller further configured to determine whether more than one of the versions of the mapping table are stored at the multiple meta-blocks,
wherein the one or more versions of the mapping table map logical block addresses to addresses of physical blocks in the system, and
wherein each version of the one or more versions is stored at a different location in the FIFO circular queue than other versions of the mapping table, and
wherein the location at which a particular version of the mapping table is stored in the FIFO circular queue reflects a relative currency of the particular version of the mapping table with respect to other versions of the mapping table stored in the FIFO circular queue.

9. The system of claim 8 and wherein the controller is further configured to select a particular version of the one or more versions of the mapping table based on a table flag associated with the particular version of the one or more versions of the mapping table and a location of the particular version of the one or more versions of the mapping table within the multiple meta-blocks upon restart and re-initialization of the system after a power loss.

10. The system of claim 8 and wherein the controller is further configured to select one or more meta-blocks from the multiple meta-blocks based on an order associated with the FIFO circular queue and to selectively write a new version of the mapping table, other than the one or more versions of the mapping table, to the selected one or more meta-blocks.

11. The system of claim 9 and wherein the controller is configured to verify at least one of a next free erased block of the physical blocks or a next block, of the physical blocks, waiting to be erased identified by the selected version of mapping table.

12. The system of claim 11 and wherein the controller is further configured to examine spare data stored at one of the next free erased block and the next block waiting to be erased identified by the selected version of the mapping table to detect data corruption.

13. The system of claim 12 and wherein the controller is further configured to reconstruct the selected version of the mapping table from the spare data when the data corruption is detected.

14. The system of claim 8 and further comprising:
an interface responsive to a host system and configured to communicate data between the controller and the host system;
a rotatable storage media that comprises at least some of the physical blocks, the at least some of the physical blocks being configured to store user data; and
a solid state memory device configured to store metadata, wherein the selected version of the mapping table is related to metadata stored at the solid-state memory device and to the user data stored at the rotatable storage media, and
wherein the selected version of the mapping table is a most recent version of the mapping table from the one or more versions of the mapping table stored at the pre-allocated storage area, and
wherein the controller is further configured to verify the most recent version of the mapping table against spare data stored in a first page or sector of a particular physical block, of the physical blocks, identified by the most recent mapping table.

15. A controller configured to store time-separated versions of a mapping table in a plurality of pre-allocated meta-blocks on a data storage medium as a first in first out (FIFO) circular queue, the controller being further configured to:
store a first one of the versions of the mapping table in a first portion of the pre-allocated meta-blocks; and store a second one of the versions of the mapping table in a second portion of the pre-allocated meta-blocks when the first one of the versions of the mapping table is stored in the first portion of the pre-allocated meta-blocks, wherein the data storage medium is a part of a data storage device, wherein each one of the versions of the mapping table maps logical block addresses to addresses of physical blocks in the data storage device, and wherein each one of the versions is stored at a different location in the FIFO circular queue than other versions of the mapping table, and wherein the location at which a particular version of the mapping table is stored in the FIFO circular queue reflects a relative currency of the particular version of the mapping table with respect to other versions of the mapping table stored in the FIFO circular queue.

16. The controller of claim 15 and wherein the controller is configured to select a most recent version of the versions of the mapping table from the plurality of pre-allocated meta-blocks.

17. The controller of claim 16 and wherein the controller is configured to select the most recent version of the versions of the mapping table from the plurality of pre-allocated meta-blocks based on a flag associated with the most recent version of the versions of the mapping table and based on a location of the most recent version of the mapping table within the plurality of meta-blocks.

18. The controller of claim 15 and wherein the controller is further configured to update at least one version of the versions of the mapping table after at least one of a data write operation, a garbage collection operation or removal of a pinned set of data.

* * * * *